United States Patent [19]

Knop et al.

[11] Patent Number: 5,009,031
[45] Date of Patent: Apr. 23, 1991

[54] GROW-MAT FOR CULTIVATING PLANTS AND A METHOD FOR MANUFACTURING SAME

[75] Inventors: Albert W. Knop, Herkenbosch; Robert J. H. M. van Banning, Munstergeleen, both of Netherlands

[73] Assignee: Rockwool Lapinus B.V., Netherlands

[21] Appl. No.: 423,620

[22] Filed: Oct. 17, 1989

Related U.S. Application Data

[63] Continuation of Ser. No. 145,615, Jan. 19, 1988, abandoned.

[30] Foreign Application Priority Data

Jan. 27, 1987 [NL] Netherlands ................. 8700196

[51] Int. Cl.⁵ .......................................... A01G 31/02
[52] U.S. Cl. ................................... 47/64; 47/9; 47/56
[58] Field of Search .......... 47/77, 9, 56, 59, 62–64; 428/288, 290

[56] References Cited

U.S. PATENT DOCUMENTS

| | | | |
|---|---|---|---|
| 2,243,857 | 6/1941 | Fischer | 47/9 |
| 2,949,698 | 8/1960 | Downey et al. | 47/9 |
| 4,283,880 | 8/1981 | Fjeldsa | 47/9 X |
| 4,369,054 | 1/1983 | Shinholster, Jr. | 47/9 X |
| 4,414,776 | 11/1983 | Ball | 47/9 |

FOREIGN PATENT DOCUMENTS

| | | | |
|---|---|---|---|
| 85731 | 8/1983 | European Pat. Off. | 428/288 |
| 201426 | 12/1986 | European Pat. Off. | 47/64 |
| 61581 | 5/1977 | Japan | 47/9 |
| 117547 | 10/1978 | Japan | 47/9 |
| 39575 | 3/1980 | Japan | 47/9 |
| 126438 | 9/1980 | Japan | 47/77 |
| 24034 | 2/1984 | Japan | 47/9 |
| 834312 | 6/1981 | U.S.S.R. | 47/9 |
| 2115848 | 1/1982 | United Kingdom . | |
| 85/00036 | 1/1985 | World Int. Prop. O. | 428/288 |
| 85/03192 | 8/1985 | World Int. Prop. O. | 47/77 |

OTHER PUBLICATIONS

The Grower (Supplement), 11/1979, pp. 19–40, 47/63, "This is Rockwool".

J. Lunenschloss, *Non-Woven Bonded Fabrics*, pp. 140–143 (1985).

*Primary Examiner*—Robert A. Hafer
*Assistant Examiner*—Kevin G. Rooney
*Attorney, Agent, or Firm*—Webb, Burden, Ziesenheim & Webb

[57] ABSTRACT

The invention relates to a grow-mat for cultivating plants, and to the production thereof, which grow-mat comprises a layer of mineral fibres cross-linked to one another by cured binding agent and treated with hydrophilic wetting agent, characterized in that in said grow-mat the principal direction of said mineral fibres extending in said layer extends in the longest dimension of said mat, in which preferably in both upright longitudinal surfaces of the grow-mat a curing oven profile is present, and/or the layer is a primary layer and at least two of said primary layers forming a secondary layer are present in a horizontal longitudinal plane of said grow-mat.

13 Claims, 5 Drawing Sheets

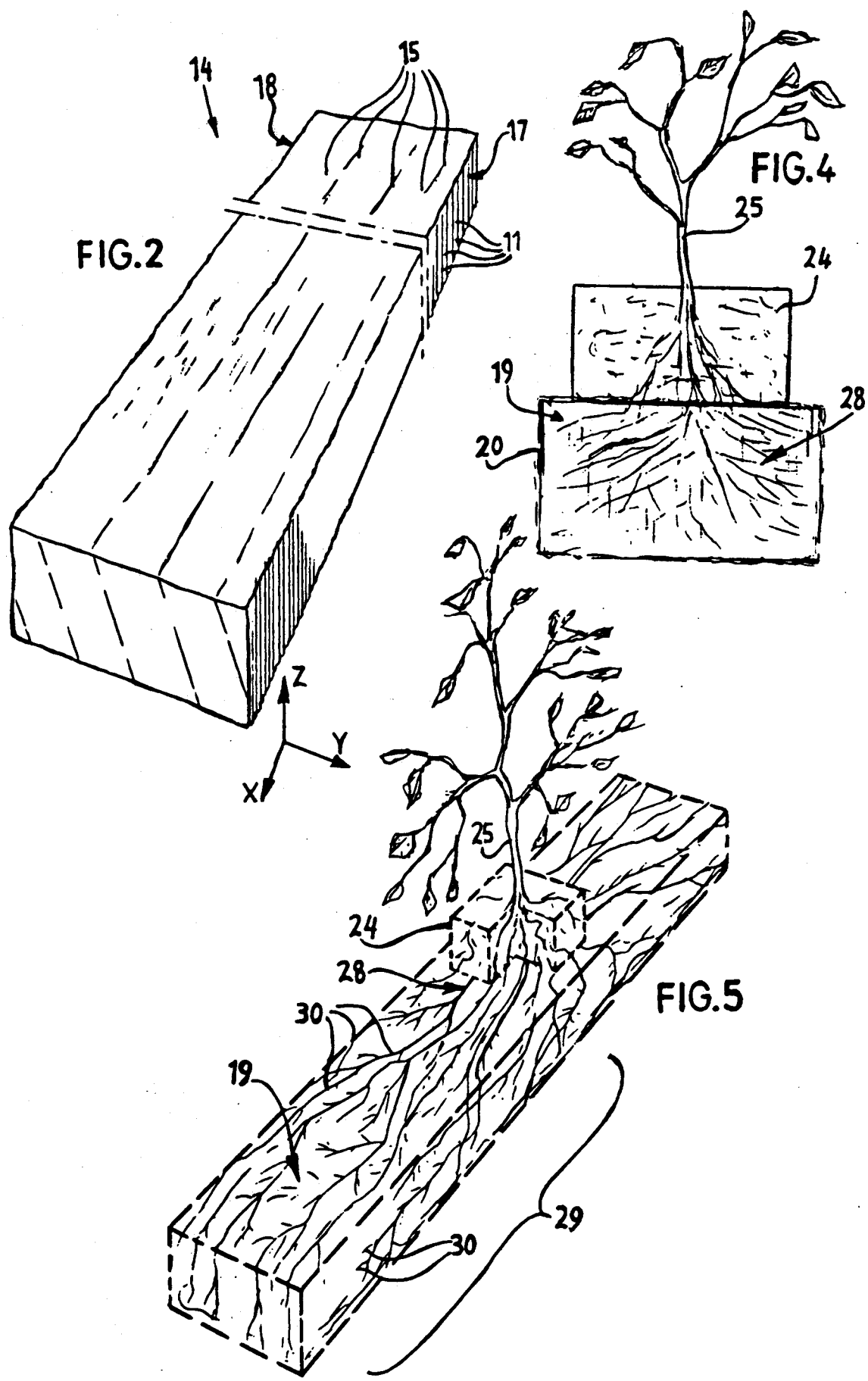

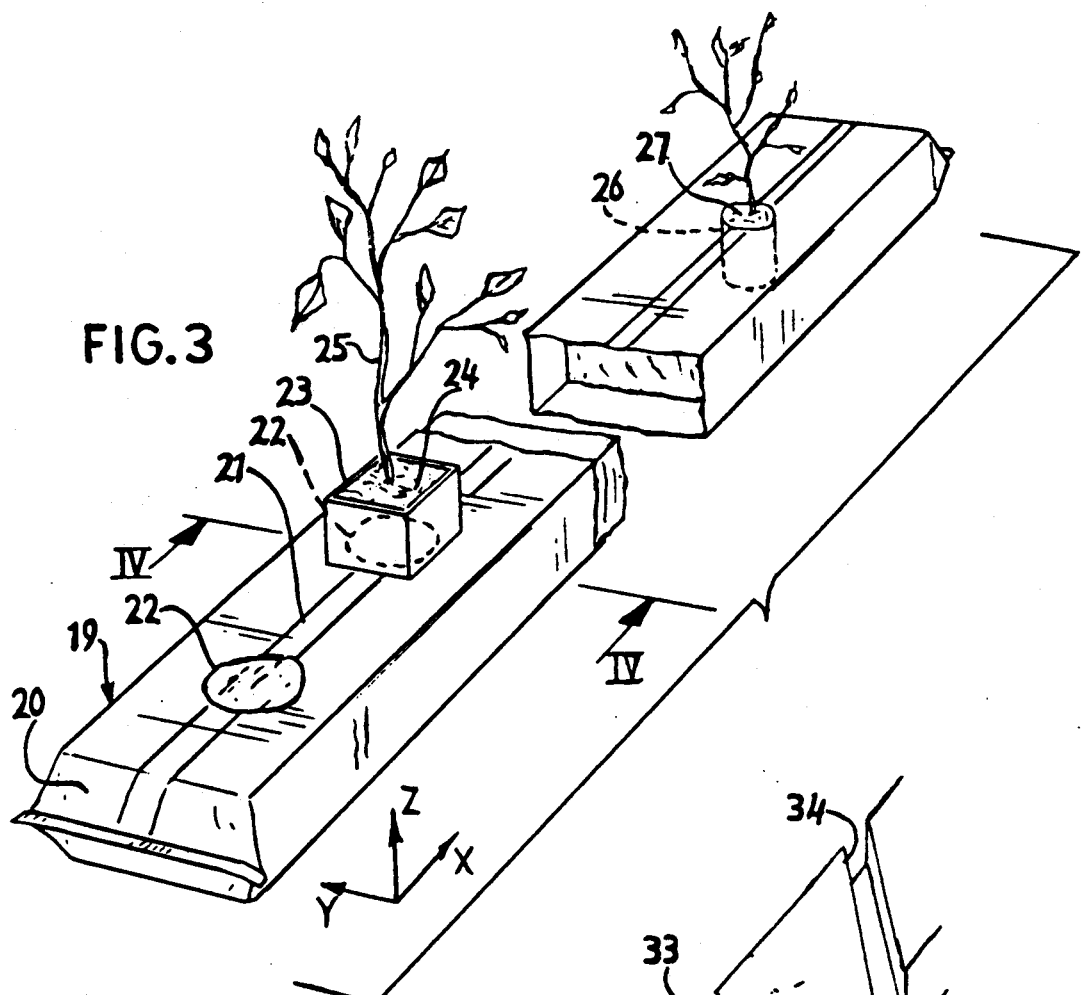
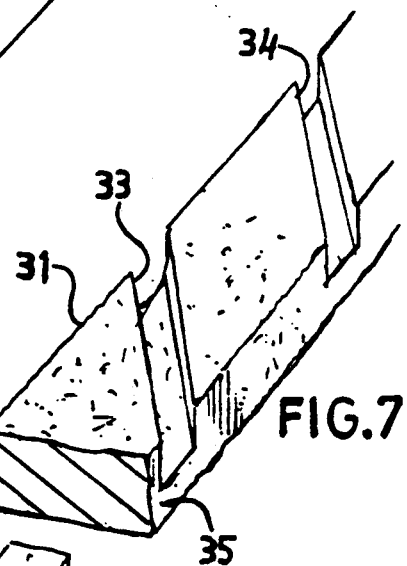
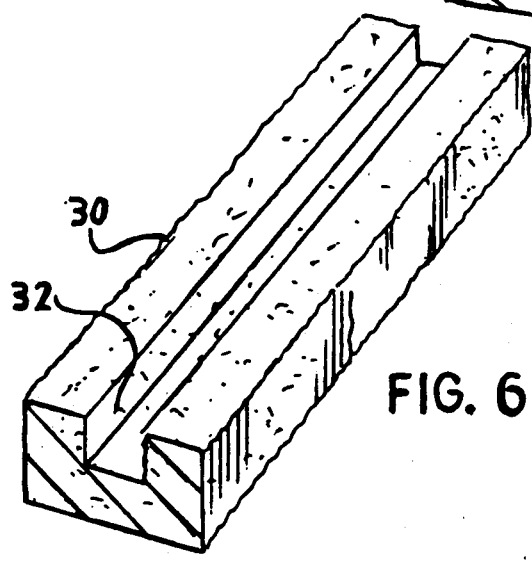

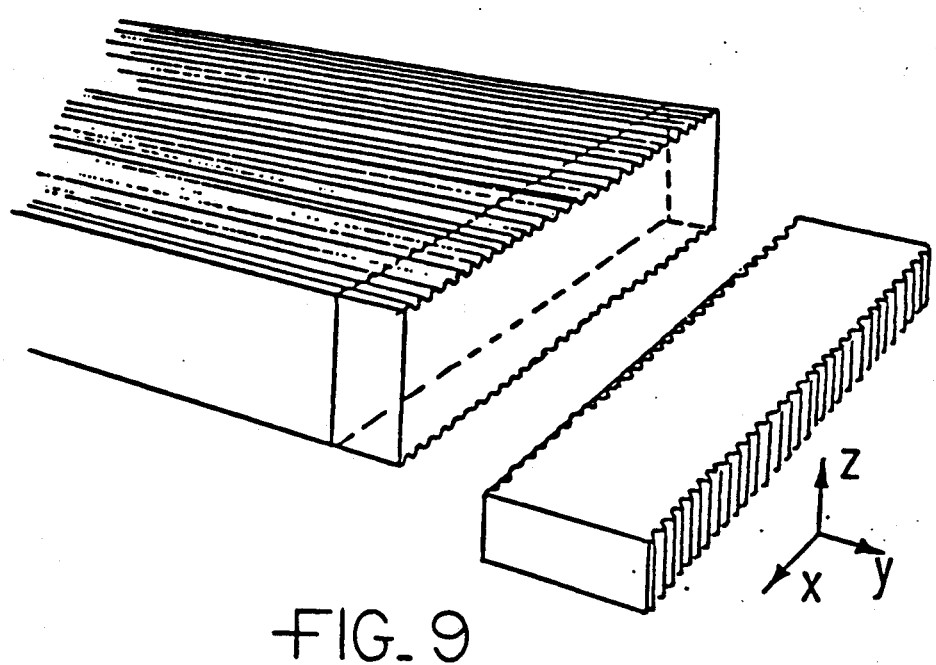
FIG_9

GROW-MAT FOR CULTIVATING PLANTS AND A METHOD FOR MANUFACTURING SAME

This is a continuation of copending applications Ser. No. 07/145,615 filed on Jan. 19, 1988 now abandoned The invention relates to a grow-mat for cultivating plants and to a method for manufacture thereof.

In the cultivation of plants, such as vegetables and flowers, on a substrate, use is made of various materials on the basis of a porous product possessing a matrix of mineral fibres wettable with water. These products comprise germinating plugs, cutting blocks usually forming part of a large multi-block, grow blocks placed in a wrapping and grow-mats, often accommodated in an envelope impermeable to water.

These grow-mats exist in a great variety of dimensions, for example 12.5–30×7.5–10×100–200 cm. The grow-mats are intended for accommodating or carrying a plant directly, or indirectly via a grow block. Plant roots grow through the grow-mat and from the watery environment present in the grow-mat they extract water and other growth substances supplied directly or indirectly to the mat.

As a consequence of the above described function of the grow-mat it must have a good compression rigidity for compression forces applied to the surface on which the plant rests. The grow-mat must on the other hand have sufficient bending rigidity in its lengthwise direction so that during laying out of the mats no tears or other defects can occur in them.

It will be apparent that as a consequence of a small compression strength and a small bending rigidity as a result of the occurrence of areas having densities differing strongly from one another and because of the occurrence of tears and splitting, the water/air management in the grow-mat is disturbed. As a result of this the plant cultivation is sub-optimal, as may be the yield. In the case of excessively small compression strength there is the further danger that the plants placed in the grow blocks on the mats will fall over. The bending rigidity is also of importance in the laying out of steam-cleaned mats that are to be re-used because breakage of the mats involves much loss of time and expense.

The object of the current invention is to provide a grow-mat and a method for manufacture thereof which results in improved handling of these elongate grow-mats, while the optimal air/water management remains ensured. This prerequisite implies that in order to improve the bending rigidity of the grow-mat a greater quantity of binding agent cannot be used, since this binder is water-repellent and can have a drastic effect on the water management in a negative sense.

The grow-mat according to the invention for cultivating plants comprising a layer of mineral fibres cross-linked to one another by cured binding agent and treated with hydrophilic wetting agent is characterized in that in the grow-mat the principal direction of the mineral fibres extending in the layer extends in the longest dimension of the mat and that present in at least one upright longitudinal surface of the grow-mat is a curing profile.

The method according to the invention for manufacturing a grow-mat for cultivating plants, comprising the forming of a layer from fiberised mineral flakes, in which layer are included a cured binder for cross-linking of the mineral fibres in the layer and a hydrophilic wetting agent to enable wetting of the mineral fibres with water, and the cutting of the layer to a grow-mat, is characterized in that the layer is cut such that the principal direction of the mineral fibres in the layer extends in the direction of the longest dimension of the grow-mat, and that the cutting pitch is substantially equal to the height of the grow-mat.

Since in accordance with the invention cutting is performed such that the mineral fibres extend substantially in length direction, the bending rigidity will increase because the fibres that are cross-linked to one another with cured binder allow only a limited mutual translation. Surprisingly however it has been found that if in preference a curing profile is in addition present in an upright longitudinal surface of the grow-mat, or in other words the cutting pitch is substantially equal to the height of the grow-mat, the compression rigidity is either not decreased relative to the know products, or scarcely so. In the known grow-mats the above defined principal direction of the mineral fibres lay transversely of the surface on which the plants come to rest and with this orientation of the fibres a maximal compression rigidity is created.

Another surprising aspect is that the grow-mat in accordance with the invention is markedly more homogeneously rooted with plant roots. Relative to known grow-mats, considerably more roots appear in the upper and central portions of the grow-mat, while the roots also have branch roots. As a result of the better rootage the grow-mat is utilized to the maximum and at moments of dehydration there is more water available in the mat for the roots.

An explanation for the only small decrease in the compression rigidity could be that the layer formed from flakes of mineral fibres possesses in addition to a principal direction also a subsidiary direction, and that this subsidiary direction which now lies transversely of the surface of the grow-mat bearing the plants provides a similar compression rigidity.

Since one or both of the upright longitudinal surfaces are provided with a curing profile a scale-like structure is formed which on the one hand contributes to the bending rigidity and on the other considerably reduces the overflowing of plants roots outside the grow-mat through these longitudinal surfaces.

In accordance with a preferred embodiment of the method according to the invention the fiberised mineral flakes are formed to a primary layer, said layer is reciprocated to a secondary layer, binder present in the secondary layer is cured, and the grow-mat is cut from the secondary layer across its longitudinal direction. In this way the grow-mat according to the invention can be cut simply and preferably via one saw-cut from the secondary layer, the saw-cut being made only in transverse direction thereof. This can be visible in the grow-mat itself and characteristic is that at least two primary layers forming a secondary layer are present in a horizontal longitudinal plane of the grow-mat. As a result of employing this reciprocating process the principal direction of the mineral fibres extending in the primary layer will not lie perpendicular to the sides of the secondary layer. Cuts can also be made in this principal direction lying at a slant to the sides, as a result of which the principal direction in the grow-mat lies in its longitudinal direction. Wedge-shaped end pieces have to be removed to obtain a block shape. The greater the increase in the number of primary layers over the height of the grow-mat, the more this corner will approach the angle of 90°. This implies that primary layers that are recognizable in the grow-mat lie at an angle inclined to the surfaces which are to accommodate the plants but at a right angle to the end surfaces of the grow-mat. The size of the oblique angle depends on the number of primary layers per secondary layer.

The number of primary layers forming a secondary layer amounts preferably to at least 4 and is more preferably 7.

It can be advantageous, especially if a plant seed, seedling or cutting is placed directly into the grow-mat, to include in the latter a pattern of holes and/or grooves. It is in this way possible to influence the distance between the plants depending on the plants for cultivating, plant varieties, cultivating season, intermediate cultivating and the like.

It is recommended as usual that the grow-mat is enveloped in a water-tight encasing preferably consisting of plastic which can if required be provided with a white colour which enables a reflection of light towards the lower part of the plants.

Finally, the invention relates to a grow-mat for cultivating plants which is manufactured substantially in accordance with a method as according to the invention.

Following hereinafter are a number of drawings, with reference to which the grow-mat and the method of manufacturing same according to the invention are further illustrated.

FIG. 2 is a perspective view on a larger scale of the grow-mat according to the invention manufactured as in FIG. 1 in its position of use;

FIG. 3 is a perspective view corresponding to FIG. 2 of a grow-mat according to the invention during cultivation;

FIG. 4 is a section along the line IV—IV from FIG. 3;

FIG. 5 is a perspective view corresponding to FIG. 3 whereby the plant rootage in a schematically illustrated grow-mat portion is shown; and FIG. 6 and 7 each show a perspective view of a grow-mat according to the invention provided with a pattern of grooves.

Figure 8:
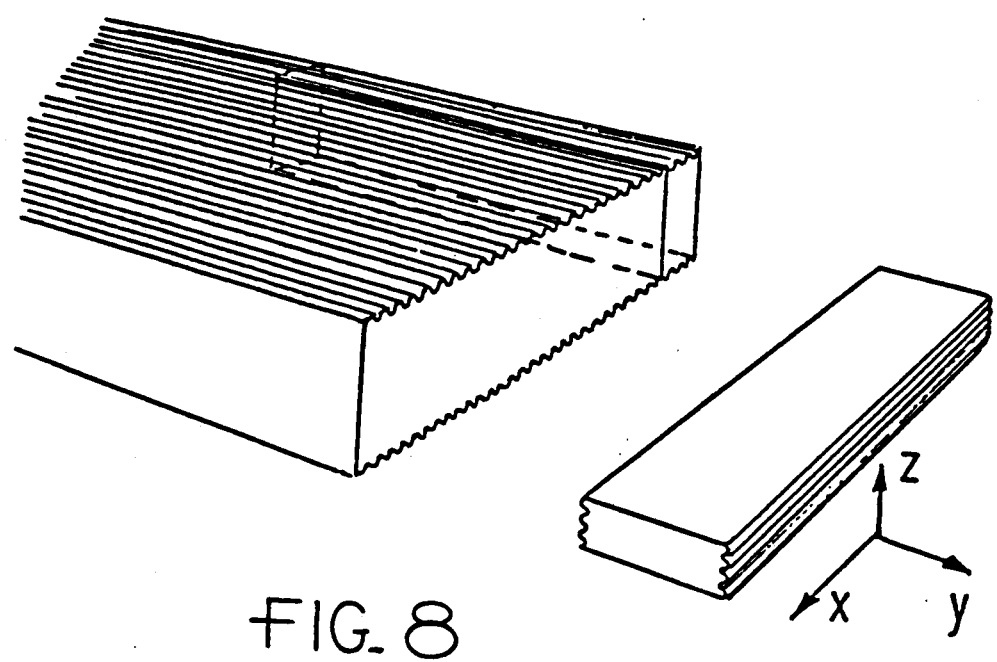

FIG. 8 illustrates how the present grow-blocks are cut from a primary layer such that the principle direction of the mineral fibers extends in the longest or lengthwise dimension of the grow-blocks and the subsidiary direction of the mineral fiber extends toward the surfaces on which the grow-blocks are placed; and FIG. 9 illustrates how the present grow-blocks are cut from a secondary layer such that the principle direction of the mineral fibers extends in the longest or lengthwise dimension of the grow-blocks and the subsidiary direction of the mineral fiber extends towards the surfaces on which the grow-blocks are placed.

Figure 1:
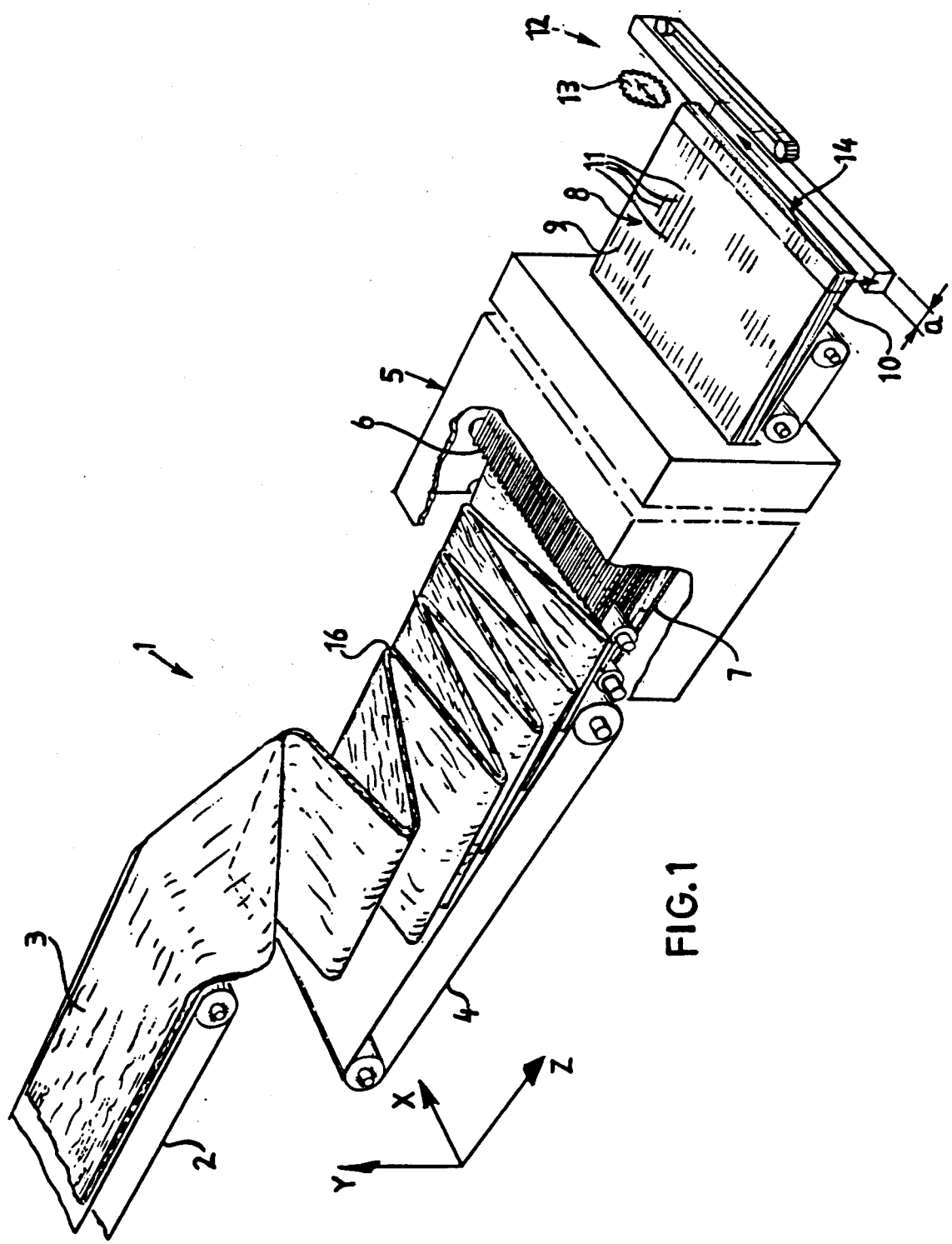
FIG. 1 is a schematic, perspective view of the manufacture, using a reciprocating method, of a secondary layer which is cut in accordance with the invention into a grow-mat.

FIG. 1 shows schematically the manufacture of a secondary layer and the cutting therefrom, specifically in accordance with the invention, of a grow-mat according to the invention.

The device 1 comprises a conveyor 2 onto which mineral flakes fiberised in a fiberising apparatus (not shown) are deposited out of an air flow, whereby during fiberising binding agent and hydrophilic wetting agent are added. The primary layer 3 present on conveyor 2 is laid off to the sides in folded state onto a conveyor 4 using known reciprocating means (not shown). The primary layer 3 laid off in roof-tile manner and in folded position is then guided through a setting oven 5. In the setting oven the primary layer folds are compressed using the conveyors 6 and 7 to the required thickness of the secondary layer 8 leaving setting oven 5. The top surface 9 and the bottom surface 10 of the secondary layer 8 are both provided with an oven profile 11.

In a cutting station 12 the secondary layer 8 is cut across its side parts using cutting member 13 moving transversely relative to secondary layer 8. The cutting pitch a corresponds substantially to the height of the grow-mat according to the invention during use.

Further shown in FIG. 1 is a system of co-ordinates, whereby the X-axis extends in width direction, the Y-axis in height direction and the Z-axis in length direction of the secondary layer 8.

FIG. 2 shows the grow-mat 14 according to the invention manufactured in FIG. 1. A system of axes is again shown. It will be apparent that the cut grow-mat 14 obtains its position of use as according to FIG. 2 as a result of tilting through its longitudinal axis (in this case the X-axis). The Y-axis corresponds with the width direction and the Z-axis with the height direction of the grow-mat 14.

Recognizable in the grow-mat 14 are structures 15 corresponding to a number of layers of primary layer. A fold 16 is not usually recognizable at the head end sections because upstream of the curing oven 5 the side parts of the folded primary layer are treated with so-called crumpling means.

Both the upright longitudinal surfaces are provided with the curing profile 11.

Depending on the required length dimension of the grow-mat 14 according to the invention and the width of the secondary layer 8, the cut grow-mat can also be divided up one or more times in transverse direction. When the secondary layer width is 2 meters, grow-mats of 1 or 2 meters are for example manufactured.

FIG. 3 shows the use of a grow-mat 19 according to the invention. Grow-mat 19 is accommodated in a water-tight envelope 20 of white plastic. A lengthwise weld seam 21 lies on the upper part of grow-mat 19 and using a suitable drill bit plant holes 22 are arranged in the envelope. Placed on each plant hole 22 is a grow block 24 accommodated in a wrapping 23, in which block grows a plant 25, for example a tomato plant of the Dombito variety.

Indicated further up in the grow-mat 19 is that a cylindrical bore hole is arranged therein. Inserted into this cylindrical bore is a germinating plug 27.

FIG. 4 and 5 show the rootage 28 in the grow-mat 19. Compared to know grow-mats it will be apparent that in the portion 29 of the grow-mat 19 lying between plants 25 there are more roots, while the upper and central portions of the grow-mat 19 are better rooted. In addition the roots are provided with branch roots 30. Although these phenomena have been observed in the case of tomatoes, it will be apparent to those skilled in the art that the same phenomena do occur with other vegetables and will occur to a greater or virtually the same extent with ornamental produce, such as flowers and plants.

A. Measurement of the Compression Rigidity.

The compression rigidity was determined using a T-shaped compression member whereby the force in newton required to achieve a determined compression was recorded. Determined in table 1 is the compression rigidity for two products of applicant, Grodan 621 (70 kg/m$^3$) and Grodan 626 (50 kg/m$^3$) which are cut both in accordance with the invention and the state of the art. With a grow-mat in accordance with the state of the art the cutting pitch corresponds with the width of the grow-mat and the height is equal to half the height of the secondary layer. In other words a curing profile is present in one of both the horizontal longitudinal surfaces. The figure in brackets indicates the number of observations.

TABLE 1

Determining of the compression rigidity of grow-mats cut both in accordance with the state of the art and as according to the invention.

| Compression rigidity (N) | Grodan 621 | Grodan 626 |
| --- | --- | --- |
| Standard | 106–154 (3) | 61.80 (2) |
| Invention | 116–144 (3) | 78 (2) |

B. Determining of Deflection

The deflection of grow-mats according to the invention and according to the state of the art are determined in accordance with a standard measuring procedure. A grow-mat with dimensions of 100×7.5×15 cm is placed on a test bench consisting of two end walls which are positioned parallel to each other at a distance of 100 cm. Two supporting walls are each placed at a distance of 10 cm from both the end walls at an interval of 80 cm from each other. A grow-mat is placed on these support points and the deflection is subsequently determined as a consequence of a weight of 1 kg. being placed in the centre of the grow-mat. This deflection is expressed in mm.

Shown in table 2 are the results of these deflection tests, determined with Grodan PL-mats of applicant. It can be clearly seen that cutting of the grow-mat in accordance with the invention results in a marked decrease in deflection and therefore a marked increase in the compression rigidity.

TABLE 2

Determining of the deflection in grow-mats cut both in accordance with the state of the art and as according to the invention.

| Deflection | PL-grow-mat |
| --- | --- |
| Standard | 52 mm |
| Invention | 7 mm |

Finally, FIG. 6 and 7 each show the respective grow-mats 30 and 31 according to the invention, each of which are provided with a pattern of grooves. Grow-mat 30 is provided with a longitudinal groove 32, in which grow blocks can be placed at intervals from one another to be selected.

The grow-mat 31 according to the invention is provided with two parallel grooves 33, 34 which lie at a slant to the long longitudinal surfaces 35, 36. It is thus possible to make an optimal choice of the intervals between the grow blocks for the plants, while in addition the grow blocks are positioned outside the central longitudinal plane of the grow-mat.

What is claimed is:

1. Grow-mat for cultivating plants, comprising a layer of mineral fibres cross-linked to one another by cured binding agent and treated with hydrophilic wetting agent, characterized in that in said grow-mat the principal direction of said mineral fibres extending in said layer extends in the longest dimension of said mat and the subsidiary direction of said mineral fibres extending in said layer extends in the heightwise dimension of said mat.

2. Grow-mat as claimed in claim 1, characterized in that in both upright longitudinal surfaces of the grow-mat a curing oven profile is present.

3. Grow-mat as claimed in claim 2, characterized in that the layer is a primary layer and that at least two of said primary layers forming a secondary layer are present in a horizontal longitudinal plane of said grow-mat.

4. Grow-mat as claimed in claim 3, characterized in that the number of primary layers forming a secondary layer amounts to at least 4.

5. Grow-mat as claimed in claim 4, characterized by a horizontal longitudinal surface to be directed towards the plants, said surface being provided with a pattern of grooves.

6. Grow-mat as claimed in claim 5 accommodated in a watertight envelope.

7. Grow-mat as claimed in claim 6, characterized in that the envelope consists of plastic.

8. Grow-mat as claimed in claim 7, characterized in that the envelope has a white colour.

9. Grow-mat as claimed in claim 1, characterized in that present in at least one upright longitudinal surface of said grow-mat is a curing profile.

10. Method for manufacturing a grow-mat for cultivating plants, comprising the forming of a layer of mineral fibres from fiberised mineral flakes, in which layer are included a cured binder for cross-linking of the mineral fibres in said layer and a hydrophilic wetting agent to enable wetting of said mineral fibres with water, and the cutting of said layer to a grow-mat, characterized in that said layer is cut such that the principal direction of said mineral fibres in said layer extends substantially in the direction of the longest dimension of said mat, and the subsidiary direction of said mineral fibres extending in said layer extends in the heightwise dimension of said mat, and that the cutting pitch is substantially equal to the height of said grow-mat.

11. Method as claimed in claim 10, characterized in that the fiberised mineral flakes are formed into a primary layer, that said primary layer is moved reciprocally to form a secondary layer, that binder present in said secondary layer is cured, and that the grow-mat is cut from said secondary is cured, and that the grow-mat is cut from said secondary layer transversely of its length direction.

12. Grow-mat for cultivating plants comprising a layer of mineral fibres cross-linked to one another by cured binder and treated with hydrophilic wetting agent, characterized in that said grow-mat is manufactured according to a method as claimed in claim 10.

13. Grow-mat for cultivating plants comprising a layer of mineral fibres cross-linked to one another by cured binder and treated with hydrophilic wetting agent, characterized in that said grow-mat is manufactured according to a method as claimed in claim 11.

* * * * *